United States Patent
Reschke

(10) Patent No.: US 8,047,241 B2
(45) Date of Patent: Nov. 1, 2011

(54) METHOD FOR FILLING ELECTROLYTE INTO BATTERY CELL AND APPARATUS FOR CARRYING OUT THE METHOD

(75) Inventor: Bill Reschke, Keswick (CA)

(73) Assignee: Hibar Systems, Ltd., Ontario (CA)

( * ) Notice: Subject to any disclaimer, the term of this patent is extended or adjusted under 35 U.S.C. 154(b) by 889 days.

(21) Appl. No.: 12/078,022

(22) Filed: Mar. 26, 2008

(65) Prior Publication Data

US 2009/0242073 A1    Oct. 1, 2009

(51) Int. Cl.
*B65B 1/04*    (2006.01)

(52) U.S. Cl. .............. 141/302; 141/59; 141/64; 141/65; 137/260; 429/72

(58) Field of Classification Search .................. 141/5, 7, 141/59, 63, 64, 65, 285, 301, 302, 144, 163; 429/71, 72; 137/260
See application file for complete search history.

(56) References Cited

U.S. PATENT DOCUMENTS

| | | | | |
|---|---|---|---|---|
| 2,543,724 A | * | 2/1951 | Iwanowski | 429/63 |
| 3,586,066 A | * | 6/1971 | Brown | 141/5 |
| 5,731,099 A | * | 3/1998 | Badger et al. | 429/72 |
| 5,738,690 A | | 4/1998 | Hughett et al. | |
| 6,497,976 B1 | | 12/2002 | Morizane | |
| 6,817,386 B2 | * | 11/2004 | Tsukano et al. | 141/57 |

FOREIGN PATENT DOCUMENTS

JP    2007099050    4/2007

* cited by examiner

Primary Examiner — Gregory Huson
Assistant Examiner — Jason Niesz
(74) Attorney, Agent, or Firm — Fitch Even Tabin & Flannery; Norman N. Kunitz

(57) ABSTRACT

A method for filling a battery cell with electrolyte, comprising:
  a) connecting the battery cell and a lower portion of a fill head chamber connected through respective first, second, third and fourth valves to a source of high pressure, the free atmosphere, a source of high vacuum and optionally a source of low vacuum, wherein only one of said valves can be open at any time, while said second valve is open;
  b) opening said third valve for a predetermined first period to discharge air from the interior of said battery cell through said chamber;
  c) separating the major upper portion of said chamber from the lower portion thereof by a sliding shut-off plunger and opening said second valve;
  d) dispensing a prescribed amount of electrolyte into said upper portion of said chamber above said plunger, while keeping said second valve open;
  e) raising said plunger to let a major portion of said dispensed liquid be sucked into said battery cell under the effect of the vacuum established therein in step b) and allowing any gas bubble in said battery cell to get removed through the electrolyte;
  f) opening said first valve for a second predetermined period to push said electrolyte into said battery cell;
  g) opening said second valve for a third predetermined period;
  h) repeating steps f) and g) at least once for the more complete removal of gases from the battery cell and filling the prescribed volume of electrolyte; and,
  i) disconnecting said battery cell from said fill head.

21 Claims, 10 Drawing Sheets

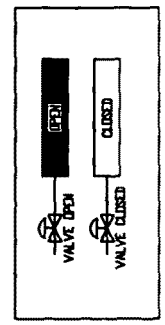
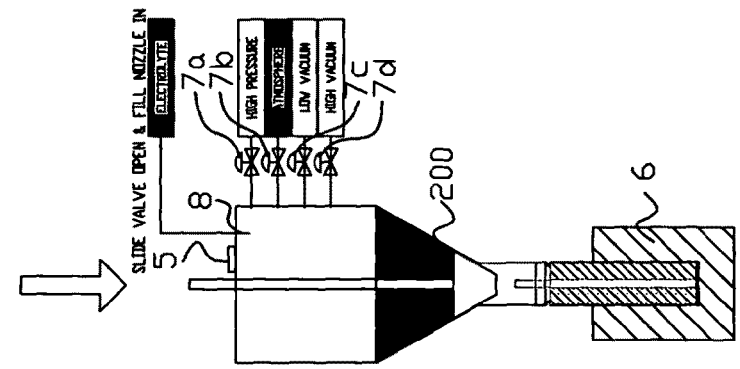
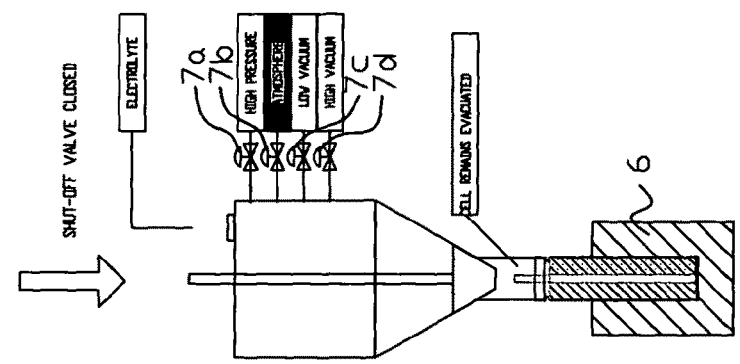
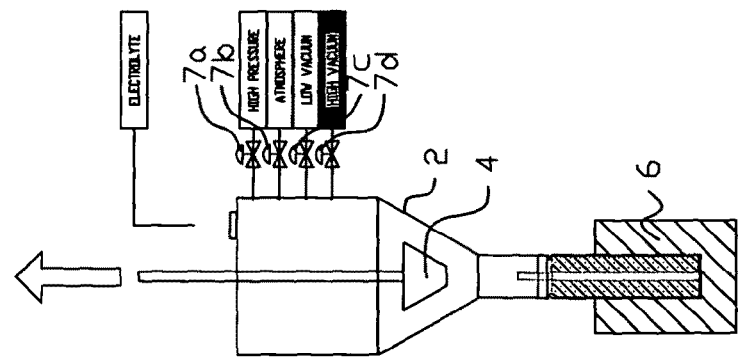
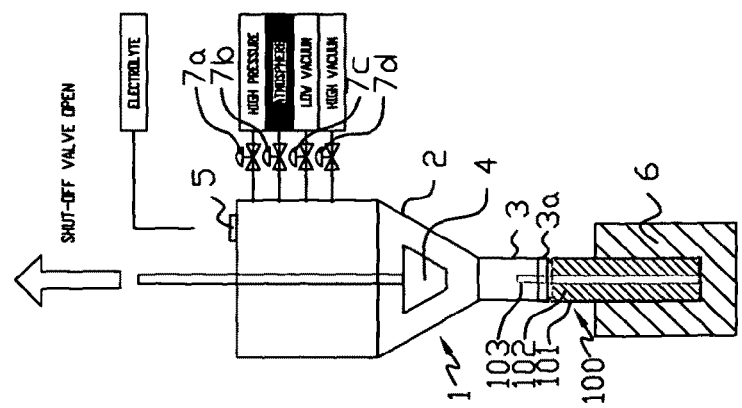

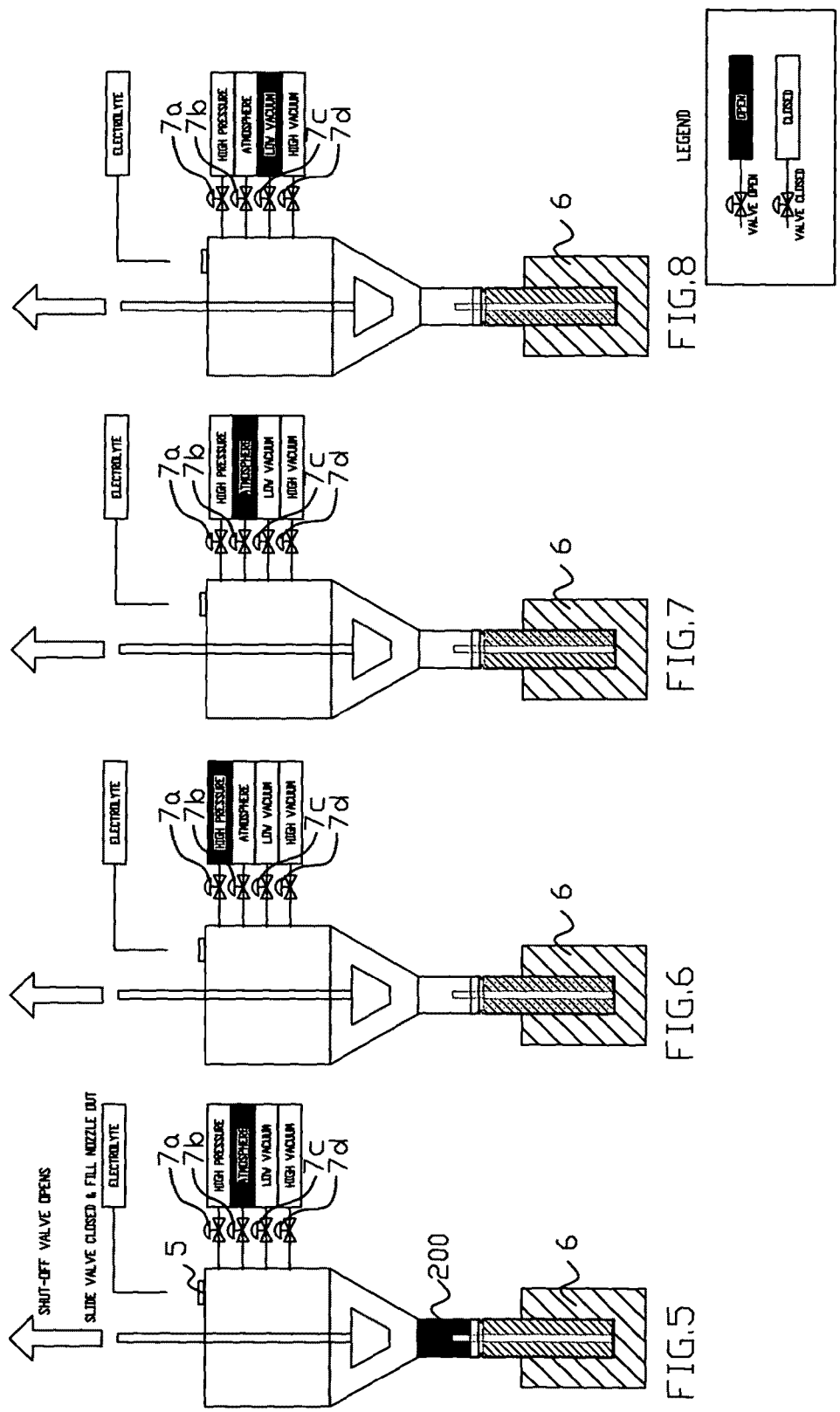

METHOD FOR FILLING ELECTROLYTE INTO BATTERY CELL AND APPARATUS FOR CARRYING OUT THE METHOD

FIELD OF THE INVENTION

The present invention relates to a method for filling electrolyte into a battery cell, to an apparatus for carrying out the method. More particularly, the electrolyte is non-aqueous in nature and used in battery cells such as lithium ion batteries.

BACKGROUND OF THE INVENTION

Batteries have become increasingly popular over the last decade due to the advent of a myriad of portable electronic devices. Especially lithium ion secondary batteries have become the predominant power source for the devices such as cellular phones, notebook or laptop computers, camcorders, digital cameras and more.

Lithium ion secondary batteries contain a spirally wound electrode assembly installed in a suitable battery case that has to be filled with non-aqueous electrolyte. In the battery case with the electrode assembly installed in it, a large number of small voids are formed. Typically, the air in the internal space of the battery is being drawn out by means of applying a vacuum and the electrolyte is filled under vacuum against atmospheric pressure. However, long time is required for completely exhausting the voids. Further, some time is required until the non-aqueous electrolyte has permeated into the electrode assembly, and it is very difficult to inject the electrolyte within a short time.

JP-07099050(A) describes an apparatus, comprising a battery arranged in a chamber and with an electrolyte to be injected into it, and a predetermined amount of electrolyte is filled in an electrolyte reservoir mounted on the injection nozzle. Then, the pressure in the chamber is reduced, and gas such as the air in the electrolyte or the electrode assembly is removed. Then, the pressure is restored to atmospheric pressure, and the electrolyte is injected. In this apparatus, however, a funnel-like member with a reservoir corresponding to the amount of the electrolyte to be injected is mounted while the top portion of the battery base with the battery element is opened, and the space inside the battery case is exhausted. A part of the electrolyte is injected into the battery case before exhausting and is permeated into the battery element. As a result, the exhausting from the voids in the electrode assembly is insufficient because of the presence of the electrolyte. Exhausting is performed while the electrolyte is present in the reservoir, which comprises a funnel-like member on the top portion of the battery case, and the pressure is applied as the atmospheric pressure. As a result, air bubbles are generated when the air passes through the funnel-like unit from inside the battery case, and these air bubbles are sent into the battery.

U.S. Pat. No. 5,738,690 teaches a method of filling a battery cell for electric vehicle applications. In this method, a special apparatus arrangement enables vacuum assisted filling of electrolyte against atmospheric pressure. The time required and the achieved electrolyte fill level are not mentioned, but will be limited by the driving force of atmospheric pressure.

U.S. Pat. No. 6,497,976 describes a method for electrolyte filling of a small size rectangular battery with a small electrolyte injection hole in the battery case. In this method, the battery case is exhausted by vacuum followed by electrolyte injection under pressure of up to 2 kgf/cm$^2$ (196 kPa) to enable quick filling of electrolyte. Filling according to this method can be achieved in 60 seconds, but cannot achieve maximum electrolyte fill levels. A problem in this filling method lies in that the high pressure is maintained till the end of the filling process, wherein the small voids cannot be filled as the air cannot escape.

One result of the presence of voids after filling is the wide deviation range of battery weight which is due to the fact that different individual battery cells can take different amount of electrolyte. The battery performance is negatively influenced by the presence of voids and by the incomplete filling of the available battery space with electrolyte.

Since maximum electrolyte fill level is very important to battery performance, some companies have started to go through 2 or 3 electrolyte fill operations on their existing vacuum fillers, which involves considerable slow down in production speeds and increased parts handing.

OBJECT OF THE INVENTION

The primary object of the invention is to provide an electrolyte filling method that can efficiently fill the available space and remove all gases, and which can provide such a filling within reasonable time and with high speed.

A further objective is to provide an apparatus for carrying out the method, which can produce batteries with highly uniform electrolyte volume.

A still further object is to carry out the method on a plurality of batteries at a time, whereby production rate can be increased.

SUMMARY OF THE INVENTION

According to the present invention it has been recognized that a special order of individual steps is required for the optimum filling, wherein between the individual steps like vacuum discharge and pressurized filling, transitional periods should be provided, in which gas bubbles can discharge, and to provide for the required transient states a special design of the filling head should be provided, making use of the fact that the electrolyte as such is a perfect separation means between the interior of the battery and the pressure conditions prevailing in the filling chamber.

By utilizing this recognition according to the first aspect of the invention a method has been provided for filling a battery cell with electrolyte, wherein the battery cell is provided with an electrolyte injection receptacle, comprising the steps of:

a) establishing a sealed connection between said electrolyte injection receptacle and a connection nozzle of a fill head defining a chamber connected through respective valves to a source of high pressure, to the free atmosphere, to a source of high vacuum and optionally to a source of low vacuum, wherein only one of said four valves can be open at any time, while during the present step a) said valve leading to the free atmosphere being open;

b) opening said valve leading to said high vacuum for a predetermined first period to discharge air from the interior of said battery cell through said chamber;

c) separating the major upper portion of the interior of said chamber from the lower portion thereof communicating with said connection nozzle by means of a sliding shut-off plunger and opening said valve connecting to the free atmosphere;

d) dispensing a prescribed amount of electrolyte in said upper part of said chamber through a temporarily opened electrolyte fill port so that the electrolyte fills a part of said interior above said shut-off plunger, while keeping said valve leading to the free atmosphere open;

e) raising said shut-off plunger to let a major portion of said dispensed liquid be sucked into the interior of said battery cell under the effect of the vacuum established therein in step b) and allowing any gas bubble in said battery cell to get removed through the electrolyte;

f) providing a mechanical support for said battery cell and opening said valve connected to said source of high pressure for a second predetermined period to push said electrolyte in said battery cell;

g) opening said valve leading to the free atmosphere for a third predetermined period; and h) repeating steps f) and g) at least once for the more complete removal of gases from the battery cell and filling the prescribed volume of electrolyte; and i) disconnecting said battery cell from said fill head.

A further recognition lies in that the pressure filling should be continued with a short atmospheric period and with a further vacuum that may drive out any existing gases. If these steps are correctly repeated, a perfect filling can be reached.

According to a second aspect of the invention a specially designed and arranged filling apparatus, mainly a fill head has been provided which uses on the one hand four valves connected to different sources of different pressure levels (high pressure, atmospheric, low vacuum and high vacuum), wherein only one of the valves can be open at a time, and on the other hand, a vertically movable plunger valve that can close down the lower portion of the fill head, to enable separation of the volume underneath and above, which will have significance if electrolyte is dispensed on the closed plunger, which—when raised—will let the electrolyte flow down and separate itself the cell interior from the space in the filling chamber. A well synchronized operation of the plunger, of the filling and of the opening of the valves enables the smooth realization of an optimum filling method.

According to a further aspect of the invention a filling head assembly has been provided, in which a number of filling heads are arranged mechanically side-by side, and the assembly enables simultaneous filling with each of its filling heads. The assembly uses only four valves for all chambers, however, each chamber is provided with an assigned plunger, and the filling (metering of the electrolyte) occurs also simultaneously through ports that open and close simultaneously by the sliding of a bar driven by a cam-follower.

The filling speed can be further increased if these assemblies are placed on respective positions of an index table, moved discretely around a central axis, wherein in a first position the placement and pick up of the assemblies can take place in a smooth and synchronized way.

BRIEF DESCRIPTION OF THE DRAWINGS

The invention will now be described in connection with preferable embodiments thereof, wherein reference will be made to the accompanying drawings. In the drawing:

FIGS. 1 to 8 show the eight distinctive stages of the electrolyte fill method;

DETAILED DESCRIPTION OF THE INVENTION

Figure 9:
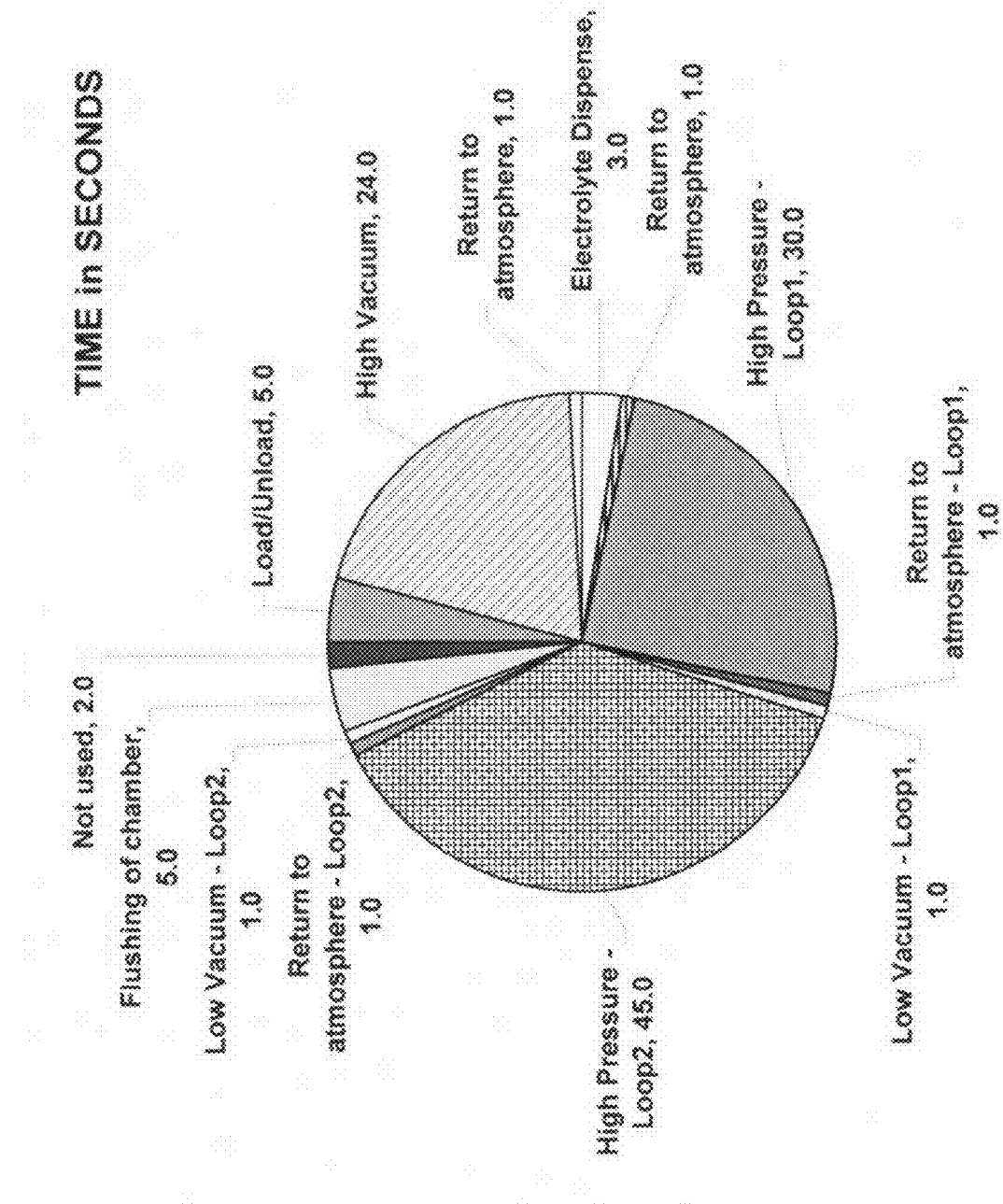
FIG. 9 shows a timing diagram of the electrolyte fill method.

In FIGS. 1 to 8 eight discrete steps of the electrolyte filling method according to the invention has been schematically illustrated. Each of these schematic drawings show the same electrolyte fill head 1 as coupled to a battery cell 100 which is kept securely in a cell support 6. The electrolyte fill head 1 comprises a pre-metering chamber 2, a cell size specific adapter nozzle 3, an elastomer seal 3*a* engaging with an appropriate connection element of the battery cell 100, a shut-off plunger 4, a slider plate valve 5, an electrolyte fill port 8 with an O-ring seal around its top circumference (see FIG. 4) and four commercial pressure valves 7*a-d* such as SS-8BK-1C from the Swagelok company. The pressure valves 7*a-d* have respective first sides communicating with the interior of the pre metering chamber well above the zone of movement of the shut-off plunger 4. The other sides of the valves 7*a-d* are coupled to different pressure or vacuum means as illustrated by the corresponding blocks bearing the reference of the type of the particular means. Valve 7*a* is coupled to a source of high pressure, valve 7*b* leads to the free atmosphere, valve 7*c* is coupled to a source of low vacuum and finally, valve 7*d* is coupled to a source of high vacuum.

The vertical operating rod of the shut-off plunger 4 is extending out through the top cover of the pre-metering chamber 2 by means of a sealed sliding connection and it can be moved up and down by means of an actuator not shown in the drawing. In the illustrated embodiment the pre-metering chamber 2 has a downwardly narrowing conical neck portion that communicates with the adapter nozzle 3. The shut-off plunger 4 has also a conical design which fits in the lower section of the conical neck and in a fully downward position the plunger 4 provides a perfect sealing between the upper and lower parts of the chamber 2 separated thereby. It can be seen in the figures that all other connections of the pre-metering chamber 2 are arranged in the upper part of the interior.

The battery cell 100 comprises a battery can 101, a spirally wound electrode assembly 102 and a weld tabs 103 that is extending out of the battery can into adapter nozzle 3 and constitutes the connection means or filing adapter of the battery cell 100.

In the first stage of the operation shown in FIG. 1 the shut-off plunger 4 and valve 7*b* are open, valves 7*a, c* and *d* are closed; therefore, the chamber 2 and battery cell 100 are at atmospheric pressure.

FIG. 2 shows the second stage of the electrolyte fill method. In this stage, the shut-off plunger 4 is still open, but valve 7*b* is closed and valve 7*d* is open enabling high vacuum, both the valves 7*a* and 7*c* are closed; therefore, the chamber 2 and the interior of the battery cell 100 is now evacuated to a pressure of about 5.3 kPa.

In the present specification the following pressure unit conversions have been used:

1 atm=101325 Pa=1.10325 bar=760 torr=14.696 psi

In this step, which is set for a predetermined amount of time, the air is removed from the battery cell 100.

FIG. 3 shows the third stage of the electrolyte fill method. In this stage, the shut-off plunger 4 is lowered and closed, and the battery cell 100 and the adapter nozzle 3 remain evacuated at 5.3 kPa. The valve 7*d* is closed and the valve 7*b* is opened enabling atmospheric pressure in the pre-metering chamber 2 above the plunger 4. The valves 7a and 7c remain closed; therefore, the interior of the chamber 2 returns to the atmospheric pressure.

FIG. 4 shows the fourth stage of the electrolyte fill method. In this stage, the shut-off plunger 4 remains closed and the battery cell 100 and the adapter nozzle 3 remain evacuated at 5.3 kPa. The positions of the valves 7a-d remain as in FIG. 3. In this stage the slide valve 5 opens, and electrolyte fill nozzles indicated by the block "electrolyte" engage with the electrolyte fill port 8, and a predetermined amount of electrolyte 200 is being dispensed into chamber 2 under atmospheric pressure. The electrolyte is being dispensed with a standard electrolyte pump model 2BC12 from Hibar Systems Limited. The predetermined electrolyte volume is the amount required to fill the electrolyte cavities of the battery cell 100 or it is by a few percent higher. The so introduced electrolyte gets into the conical neck of the chamber 2 just above the plunger 4.

FIG. 5 shows the fifth stage of the electrolyte fill method. In this stage, the slide valve 5 is closed shut again and the settings for the valves 7a-d remain as in FIG. 4. After the slide valve 5 is closed, the shut-off plunger 4 is opened (raised), and the vacuum in the battery cell 100 and the adapter nozzle 3 will suck in the electrolyte as they have been previously evacuated to 5.3 kPa before and the pressure above the electrolyte is at atmospheric pressure. Not all of the pre-metered electrolyte 200 will flow into the battery cell 100 at this stage, and certain amount of electrolyte 200 will remain in the adapter nozzle 3 area at varying levels depending on each individual cell condition. The reason of the incomplete filling lies in that even after the application of the vacuum, certain air-bubbles can remain in the cavities of the battery cell 100 and cannot provide space for the inflowing electrolyte.

FIG. 6 shows the sixth stage of the electrolyte fill method. In this stage, the slide valve 5 remains closed and the shut-off plunger 4 opened. The valve 7b is closed and the valve 7a is opened while the valves 7c and 7d are closed. Opening the high pressure valve 7a causes a high pressure of approx. 800 kPa to be applied over the electrolyte, which forces the electrolyte further into the battery cell 100. Not all of the pre-metered electrolyte 200 will flow into battery cell 100 at this stage, and certain volume of the electrolyte 200 will remain in the adapter nozzle 3 area at varying levels depending on each individual cell condition. At this stage of high pressure soak, the battery cell 100 has to be supported by an at least equivalent counter-pressure that is provided by a pneumatic cylinder acting on the cell support 6.

FIG. 7 shows the seventh stage of the electrolyte fill method. In this stage, the slide valve 5 remains closed and the shut-off plunger 4 is opened. The valve 7a is closed and the valve 7b is opened, while the valves 7c and 7d are closed. Opening the atmospheric pressure valve 7b allows for the gases trapped in the battery cell 100 to be released.

FIG. 8 shows the eighth stage of the electrolyte fill method. In this stage, the slide valve 5 remains closed and the shut-off plunger 4 opened. The valve 7b is closed and the valve 7c is opened while the valves 7a and 7d are closed. Opening the low vacuum valve 7c (that provides a vacuum pressure of about 41.3 kPa) causes further remaining gases to be drawn out from the battery cell 100.

In this electrolyte fill method, the steps of FIGS. 6 to 8 can be repeated as often as necessary to achieve a complete fill of all the predetermined amount of electrolyte into the battery cell 100. It has been found that a single repeated cycle through the steps shown in FIGS. 6 to 8 is sufficient for achieving a complete fill. However, depending on the electrolyte composition and the cell configuration, more cycles may be needed.

Several tests have been carried out in order to achieve an optimum time/performance timing for the different steps illustrated. As a result, an optimum timing has been devised which is illustrated in FIG. 9 showing the duration of the steps shown in FIGS. 1 through 8. The battery load/unload section with a time allocation of 5 seconds represents the stage of FIG. 1. The high vacuum stage of FIG. 2 is applied for 24 seconds followed by a short 1 second return to atmosphere stage of FIG. 3. The electrolyte dispense stage of FIG. 4 has a time allotment of 3 seconds followed by a short 1 second return to the atmosphere stage of FIG. 5. Next, the first loop of FIG. 6 with high pressure for 30 seconds follows, then a short 1 second return to atmosphere stage of FIG. 7 and another 1 second of low vacuum stage of FIG. 8. Next, a second loop of FIGS. 6-8 stages follows with 45 seconds high pressure, 1 second atmosphere and 1 second low vacuum. At this stage, all the electrolyte has been filled into the battery cell 100 and the battery cell 100 can be disengaged from the adapter nozzle 3. The timing cycle has also a provision for flushing the pre-metering chamber 2 with an appropriate solvent to clean the chamber 2 from salt deposits, which cleaning step has not been illustrated in FIGS. 1 to 8. This cleaning period lasts for 5 seconds and a 2 seconds spare time remains for a total cycle time of 120 seconds per fill head.

Figure 10A:
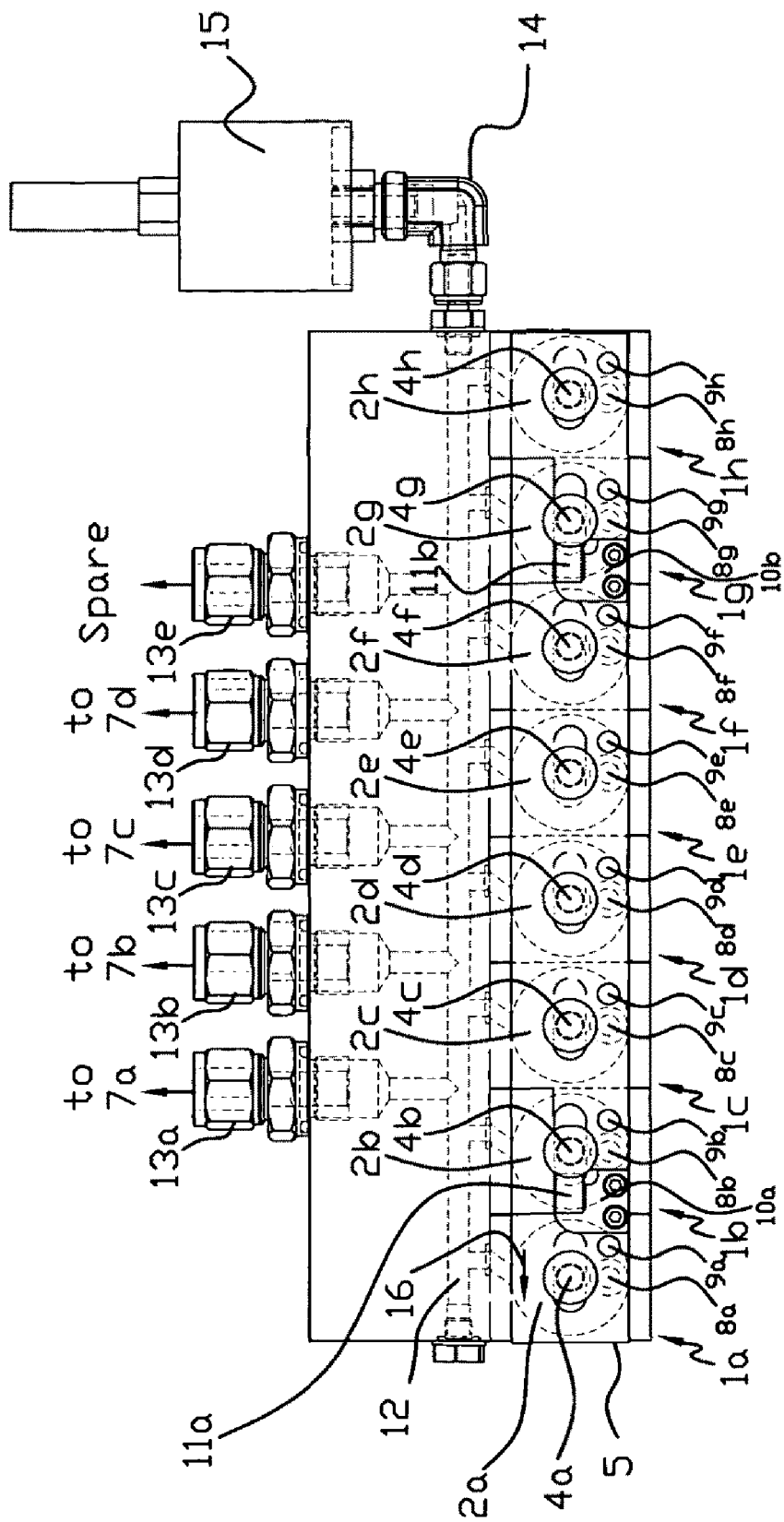
FIG. 10*a* shows a top section view of a fill head assembly for filling 8 stations simultaneously.
Figure 10B:
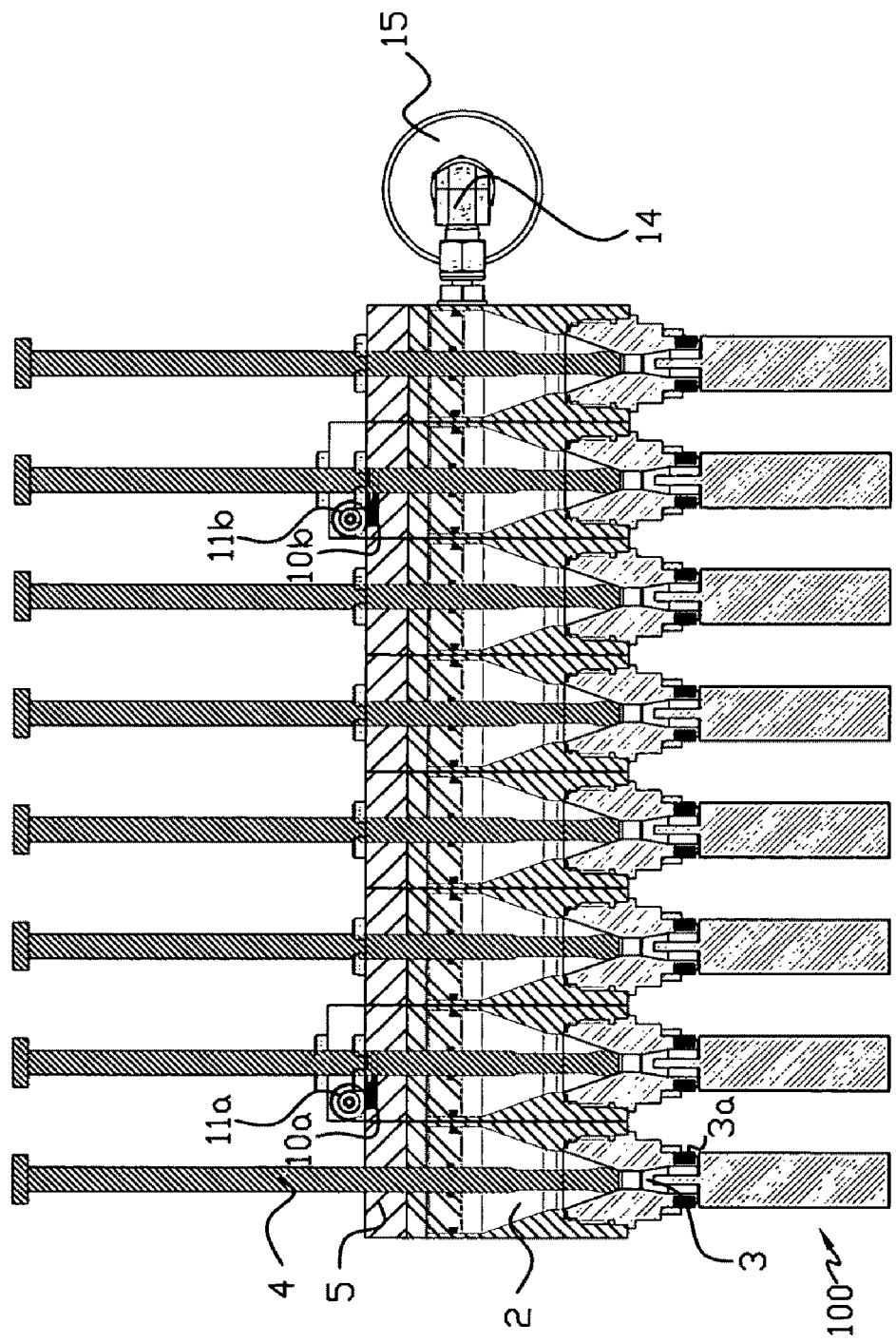
FIG. 10*b* shows a front section view of a fill head assembly for filling 8 stations simultaneously.

A preferable embodiment of an electrolyte filling apparatus that operates according to the aforementioned methods uses eight electrolyte fill heads 1 constituting a fill head assembly. FIGS. 10a and 10b show in respective top and elevation sectional views such a fill head assembly for simultaneously filling eight battery cell stations. The reference numerals in FIGS. 10a and 10b refer to the same parts as in the schematic drawings of FIGS. 1-8, but have the letters a-h added for each of the fill heads.

Referring to the top view of FIG. 10a, the fill head assembly has eight electrolyte fill heads 1a through h, one slider plate assembly 5 with eight access holes 9a through 9h, one pressure manifold 12 connecting to the chambers 2a through 2h of all the eight fill heads, and connectors 13a-13d, which connect to the pressure valves 7a-7d. The manifold 12 has an optional spare connector 13e, which can be used for flushing and cleaning the whole fill head assembly. Furthermore, the manifold 12 has an inlet adapter 14, which connects to an industrial pressure transducer 15 such as model number K-68073-06 from Cole Parmer Instrument Company of Vernon Hills, Ill., USA. Note that in this view of FIG. 10a, the slider plate assembly 5 is in closed position. The slider plate assembly 5 will move to the left as indicated by arrow 16 until the access holes 9a-h will align with the electrolyte fill ports 8a-h, guided by cams 10a-b and cam follower 11a-b. The lateral movement of the slider plate assembly 5 is facilitated by a pneumatic cylinder (not shown) that is connected to it.

Figure 11A:
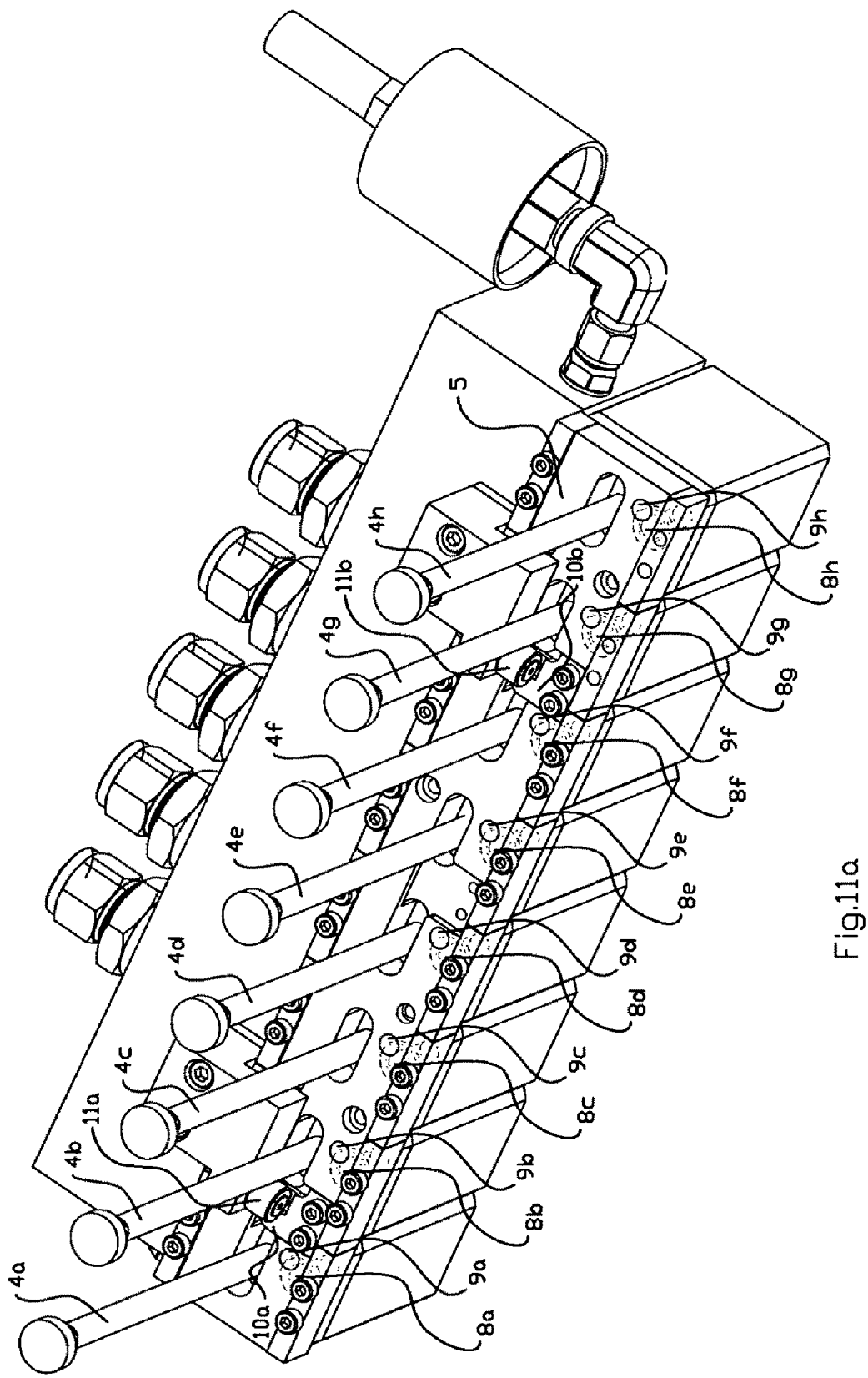
FIG. 11*a* shows a 3D view of an 8 fill head assembly with the slide valve in closed position.
Figure 11B:
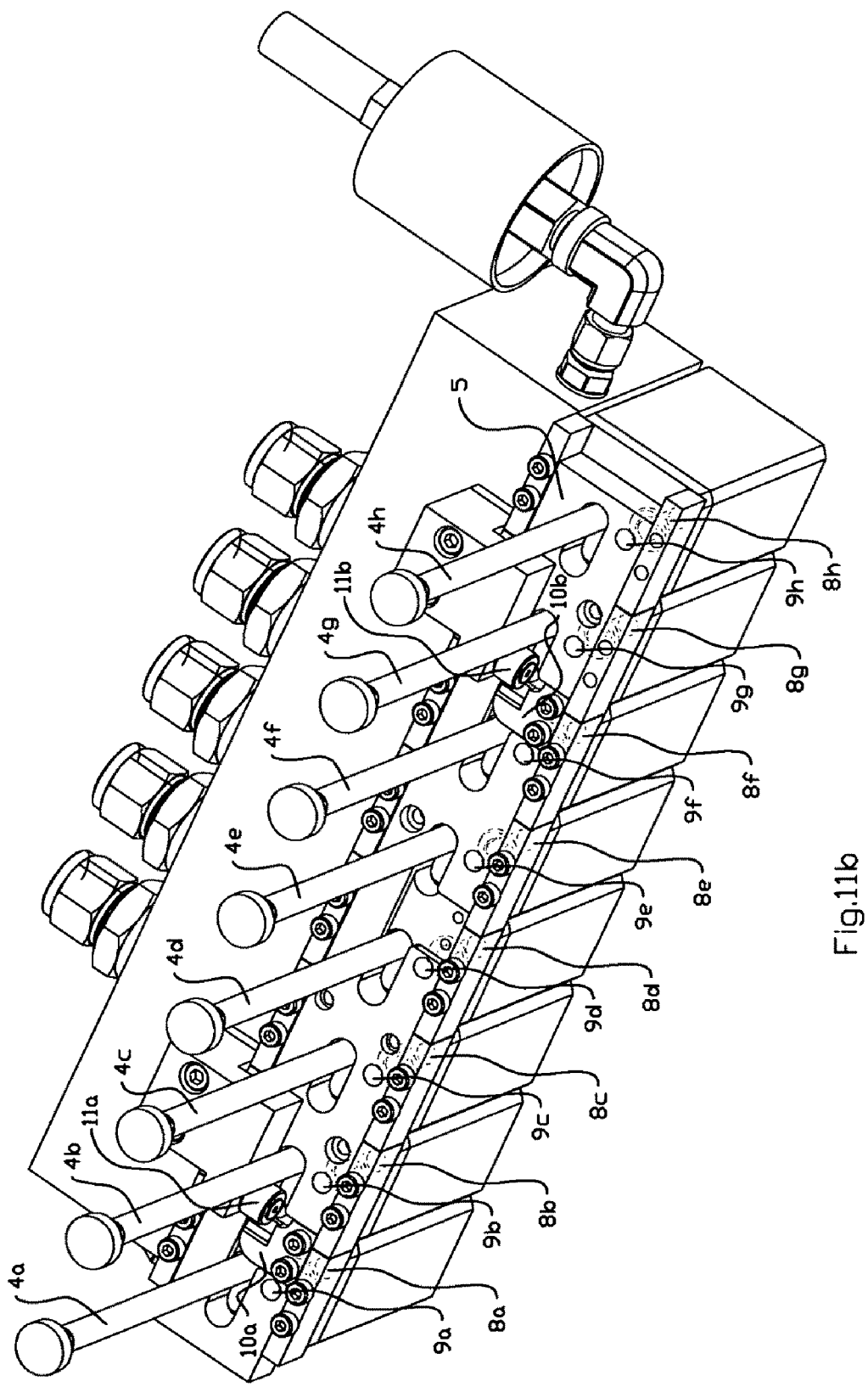
FIG. 11*b* shows a 3D view of an 8 fill head assembly with the slide valve in open position.

Referring to FIG. 10b, the two cams 10a-b and the two cam followers 11a-b can be seen in a side view with the slider plate assembly 5 in the closed position. The battery cells 100 are engaged to the fill heads adapter nozzles 3 and sealed via elastomer seals 3a. In FIGS. 11a and 11b respective three-dimensional (3D) top views are shown for the fill head assembly with the slider plate assembly 5 provided with eight filling heads, wherein FIG. 11a shows the closed and FIG. 11b the open positions. In FIG. 11a, the slider plate assembly 5 is in the closed position, the electrolyte fill ports 8a-h are tightly sealed to the bottom surface of the slider plate assembly 5 by means of O-ring seals that are present around the circumference of the electrolyte fill ports 8a-h and squeezed together by the action of the profile of the cams 10a-b, and the cam followers 11a-b engage in this position.

Figure 11C:
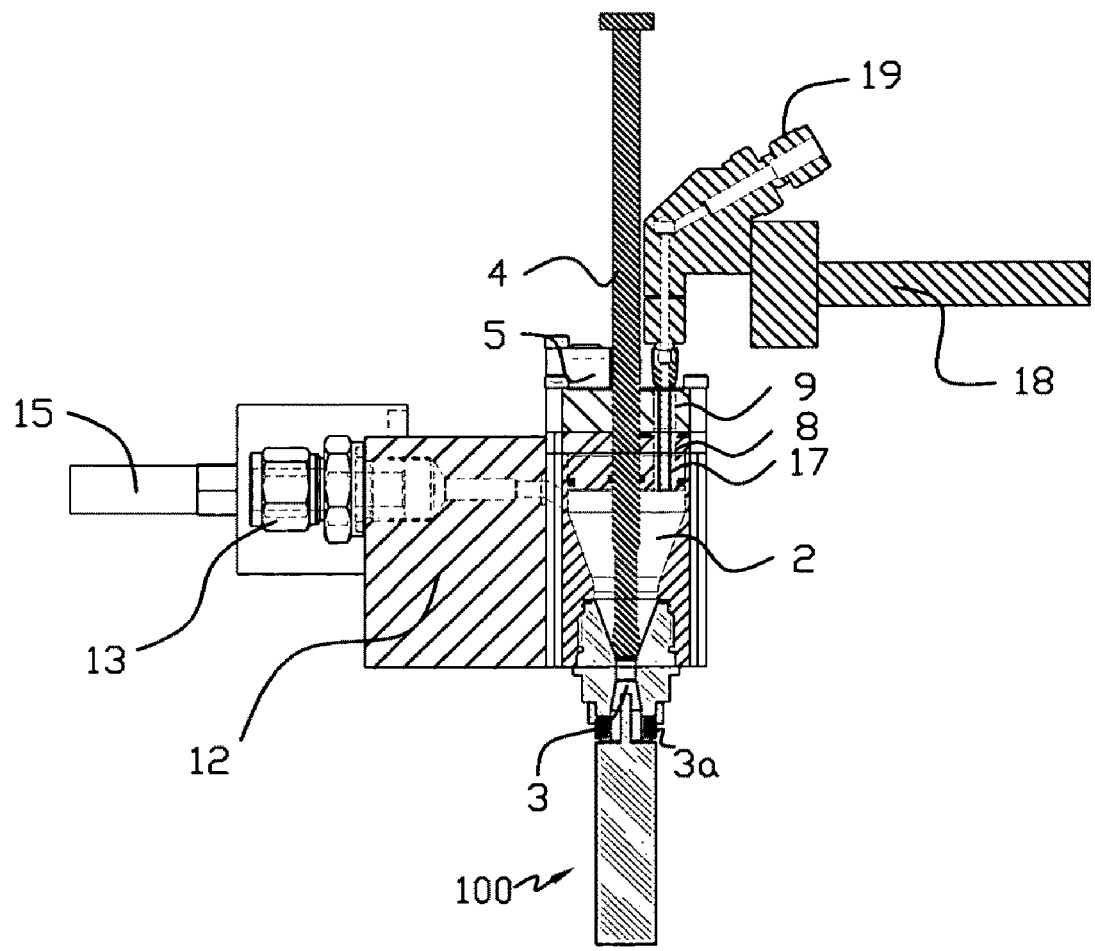
FIG. 11*c* shows a side section view of an 8 fill head assembly with the slide valve in open position and the electrolyte fill nozzles engaged.

In FIG. 11b, the slide plate assembly 5 is in the open position, the electrolyte fill ports 8a-h are in line with the access holes 9a-h of the slide plate assembly 5. The O-ring seals that are present around the circumference of the electrolyte fill ports 8a-h are not squeezed in this position as a result of the profile of the cams 10a-b. In FIG. 11c an elevation sectional view of one of the eight fill heads of the electrolyte fill head assembly is shown with the slide plate assembly 5 in the open position and the electrolyte fill nozzles engaged into the electrolyte fill ports 8a-h. The electrolyte fill ports 8a-h remain in line with the access holes 9a-h of the slide plate assembly 5 and the O-ring seals that are present around the circumference of the electrolyte fill ports 8a-h remain not squeezed. There is a clearance between the electrolyte fill ports 8 and the electrolyte fill nozzles 17 so that they are subject to ambient pressures. The electrolyte fill nozzles 17 engage deep down into the pre-metering chamber 2 to avoid splashing of the electrolyte and they are mounted to a nozzle adapter 18 that is mounted on motorized controls (not shown) for the insertion and retraction of the nozzles. The motorized nozzles move down and up as well as towards and away from the fill heads. The nozzle connector 19 connects to the electrolyte line of a standard electrolyte pump (not shown) model 2BC12 from Hibar Systems Limited.

Figure 12:
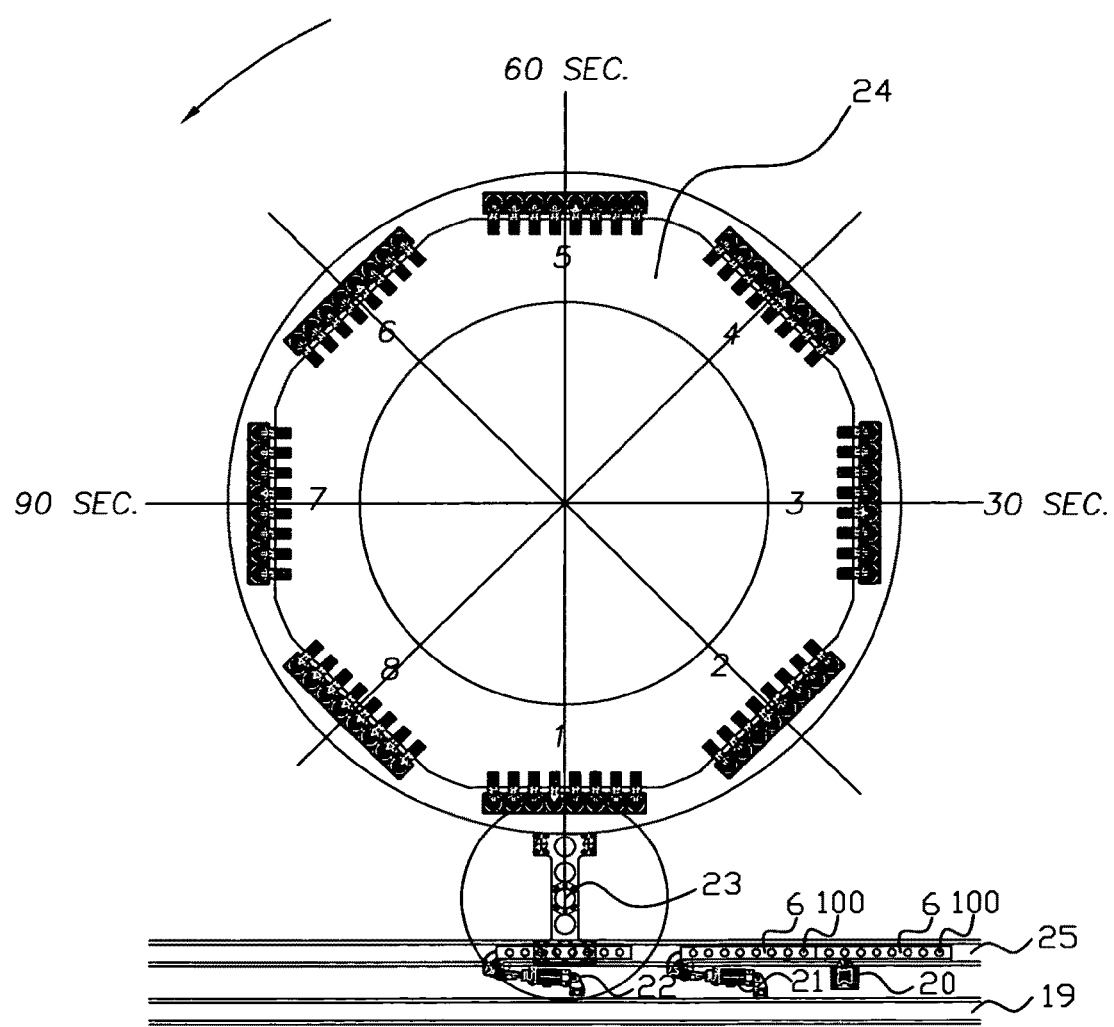
FIG. 12 shows a schematic top view of a rotary index apparatus with 8×8 fill head assemblies.

FIG. 12 shows a schematic top view of a rotary index apparatus with 8×8 fill head assemblies set at a speed of one revolution per 120 seconds for a production fill rate of 32 battery cells per minute. The rotary index table has 8 distinct index positions 1 to 8 and in each position a respective one of the fill head assemblies can be found. At a set speed of 120 seconds per revolution, a time allocation of 15 seconds per each index position is mandated. To index from one position to the next, 2 seconds are required leaving 13 seconds dwell period in this position. The dwell period can be increased or decreased as required, but will affect the production rate. An increase of the dwell period will reduce the production output rate and a decrease in dwell time will increase the production output. The optimum dwell period will depend on the electrolyte composition, desired electrolyte weight to be filled and the specifics of the battery cell 100. The pressure valves 7a-d of each 8-up electrolyte fill head assembly are connected to a commercial rotary union manifold model # AP361 supplied by Scott Rotary Seals Inc. of Hindsdale, N.Y., USA, which enables the provision for continuous application of vacuum or pressure on the battery cells 100 engaged to nozzles 3a-h while they are on the rotary index apparatus.

The battery cells 100 are transported in their corresponding cell supports 6 on a conveyor 25 towards a pick and place station 23. The pick and place station 23 picks up the cell support 6 including the battery cells 100, rotates by an angle of 180° and places the cell support 6 including the battery cells 100 onto the first of the eight index stations (position 1 in FIG. 12). After all the eight index positions have been loaded one by one with cell supports 6 including the battery cells 100, the pick and place station 23 will unload the cell support 6 including the battery cells 100 when returning again at the first index station, while simultaneously picking up the next cell support 6 including the battery cells 100 to be loaded at this first index station. After the 180° rotation, the filled battery cells 100 in the cell support 6 arrive on the conveyor 25, a position gate 22 releases and the filled battery cells 100 in the cell support 6 will travel downstream on the conveyor 25 to the next station in the process. At the same time, pre-stage gate 21 opens and lets the next cell support 6 including the battery cells 100 advance to the pick and place position gate 22. Pre-stage clamp 20 holds the upstream cell support 6 including the battery cells 100 in place so that only one cell support 6 including the battery cells 100 can advance to the pick and place position gate 23. Return conveyor 19 returns empty cell supports 6 for loading with battery cells 100.

Referring to the timing diagram of FIG. 9 which corresponds to a preferred operation of the rotary index table and reference is also made to the eight stages explained in connection with FIGS. 1 to 8. The load/unload section with a time allocation of 5 seconds is done in position 1 of the rotary index table and this position also represents the stage of FIG. 1. Still in this position 1, the high vacuum stage of FIG. 2 starts. Once the total index time of 15 seconds is used up, the 8-up fill head assembly with the battery cells 100 engaged and under vacuum is indexed counterclockwise to the position 2 and the applied vacuum stage continues for a total of 24 seconds followed by a short 1 second return to atmosphere stage of FIG. 3. At the 30 second mark, the rotary table indexes again to the next position 3. In this position, the electrolyte dispense stage of FIG. 4 has a time allotment of 3 seconds followed by a short 1 second return to atmosphere stage of FIG. 5. Still in position 3, the first loop of FIG. 6 with high pressure starts. Once the total index time of 15 seconds is used up in this position, the 8-up fill head assembly with the battery cells 100 engaged and under continued high pressure is indexed counterclockwise to the position 4 and thus the previously applied high pressure stage continues. Once the total index time of 15 seconds is used up in this position, the 8-up fill head assembly with the battery cells 100 engaged and still under high pressure is indexed counterclockwise to the position 5, and the applied high pressure stage continues for a total of 30 seconds, then a short 1 second return to the atmosphere stage of FIG. 7 takes place and another 1 second of low vacuum stage of FIG. 8 follows. Still in the position 5, a second loop corresponding to the stages of FIGS. 6-8 starts. Once the total index time of 15 seconds is used up in this position, the 8-up fill head assembly with the battery cells 100 engaged and under high pressure is indexed counterclockwise to the position 6 and the applied high pressure stage continues. Once the total index time of 15 seconds is used up in this position, the 8-up fill head assembly with the battery cells 100 engaged and high pressure applied is indexed counterclockwise to the position 7 and the applied high pressure stage continues. Once the total index time of 15 seconds is used up in this position, the 8-up fill head assembly with the battery cells 100 engaged and the high pressure applied is indexed counterclockwise to the position 8 and the applied high pressure stage continues for a total of 45 seconds high pressure, 1 second atmosphere and 1 second low vacuum. At this stage all the electrolyte has been filled into the battery cells 100, and the battery cells can disengage from the adapter nozzles 3a-h. In the position 8, a provision for flushing the chambers 2a-h with a solvent to clean the chambers from salt deposits is provided and applied for 5 seconds. A 2 seconds spare time is allotted for a total cycle time of 120 seconds per fill head.

It should be noted that during the stage of high pressure soak, the battery cells 100 in the cell support 6 have to be supported by at least an equally high counter-pressure. This is accomplished by means of a pneumatic cylinder acting on the cell support 6.

Figure 13:
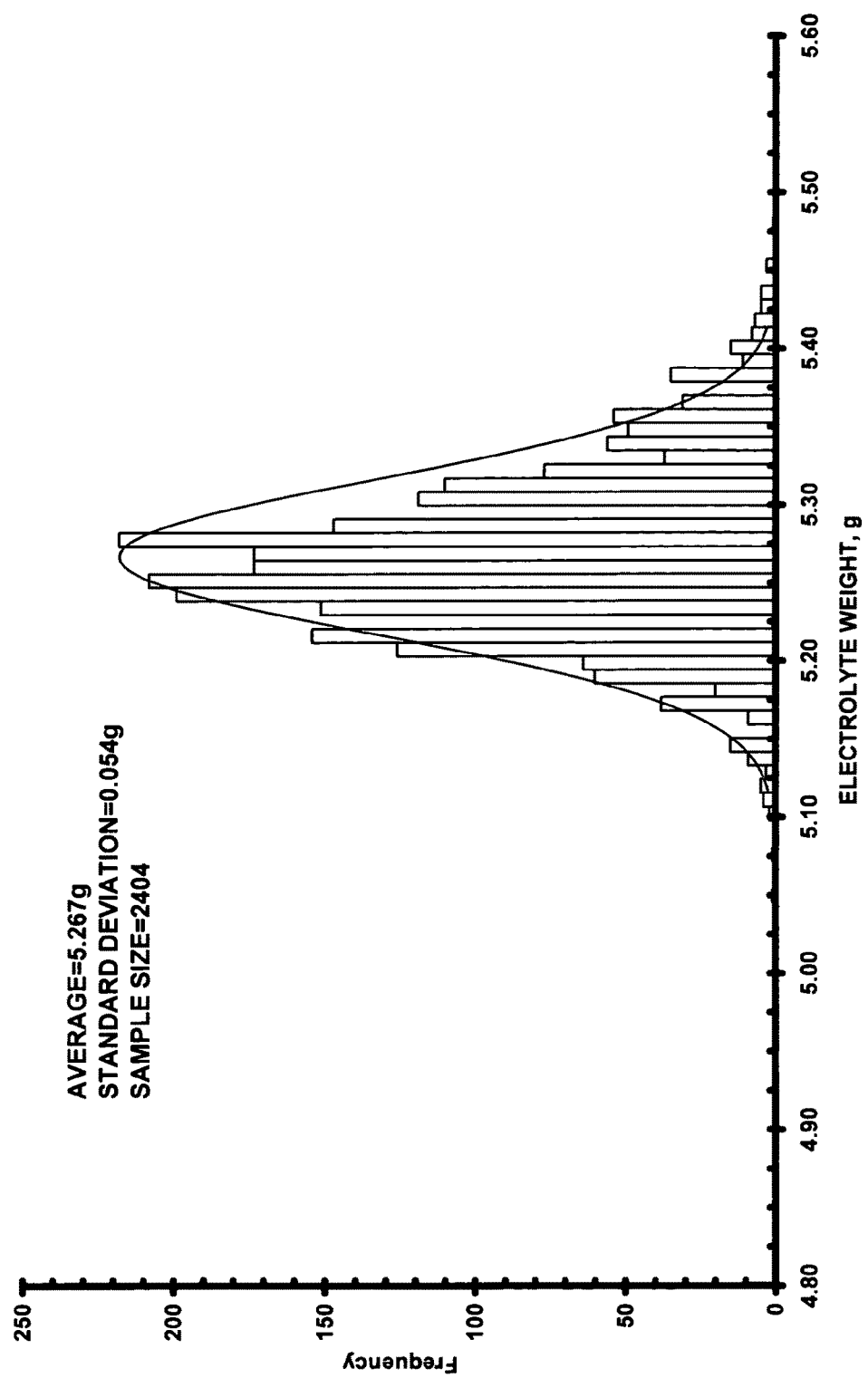
FIG. 13 shows the electrolyte weight distribution of a test fill of 18650 Li-Ion battery cells.

To test the efficacy of this electrolyte fill method a test run of filling semi-finished standard 18650 size Li-Ion battery cells 100 was carried out. The test electrolyte was propylene carbonate (PC) from Ferro Corporation of Cleveland, Ohio. With prior art electrolyte fill systems, 2 fillings with 2.5 g each were needed to achieve a 5 g electrolyte fill. With the method of the present invention it was possible to achieve an average electrolyte weight of 5.3 g during a single fill cycle. FIG. 13 shows the distribution of the electrolyte weight for a test fill of 2404 battery cell samples. The distribution curve of FIG. 13 is a very expressive illustration of the superior properties of the method according to the present invention. The battery cells have become filled with optimum volume of electrolyte, leaving practically no void spaces, and the weight-distribution (filling volume) was very uniform. The apparatus according to the present invention has been able to provide such a fast and uniform filling with a high productivity. The small standard deviation of the average weight demonstrates that there was no need for using a further fill cycle.

In another embodiment, an electrolyte filling apparatus was provided with 16 electrolyte fill heads 1. This rotary index apparatus with 8×16 fill head assemblies was also set to operate at a speed of one revolution per 120 seconds, thus the production fill rate was 64 battery cells per minute.

The invention claimed is:

1. A method for filling a battery cell with electrolyte, wherein the battery cell is provided with an electrolyte injection receptacle, comprising the steps of:
   a) establishing a sealed connection between said electrolyte injection receptacle and a connection nozzle of a fill head defining a chamber connected through respective valves to a source of high pressure, to the free atmosphere and to a source of high vacuum, wherein only one of said valves can be open at any time, while during the present step a) said valve leading to the free atmosphere being open;
   b) opening said valve leading to said high vacuum for a predetermined first period to discharge air from the interior of said battery cell through said chamber;
   c) separating a major upper portion of the interior of said chamber from a lower portion thereof communicating with said connection nozzle by a sliding shut-off plunger and opening said valve connecting to the free atmosphere;
   d) dispensing a prescribed amount of electrolyte in said upper portion of said chamber through a temporarily opened electrolyte fill port so that the electrolyte fills a part of said interior above said shut-off plunger, while keeping said valve leading to the free atmosphere open;
   e) raising said shut-off plunger to let a major portion of said dispensed liquid be sucked into the interior of said battery cell under the effect of the vacuum established therein in step b) and allowing any gas bubble in said battery cell to get removed through the electrolyte;
   f) providing a mechanical support for said battery cell and opening said valve connected to said source of high pressure for a second predetermined period to push said electrolyte into said battery cell;
   g) opening said valve leading to the free atmosphere for a third predetermined period; and
   h) repeating steps f) and g) at least once for the more complete removal of gases from the battery cell and filling the prescribed volume of electrolyte; and
   i) disconnecting said battery cell from said fill head.

2. The method as claimed in claim 1, wherein said chamber of said fill head is connected to a further valve leading to a source of low vacuum, and said further valve can be open when all other ones of said valves are closed, and wherein after said step g) and before said step h) opening one of the valves leading to said source of low vacuum for a fourth predetermined period to facilitate discharge of any residual gases in said battery cell.

3. The method as claimed in claim 2, wherein said repeating step h) includes said vacuum step carried out during said fourth predetermined time period.

4. The method as claimed in claim 1, wherein said high pressure is higher than 500 KPa and lower than 1000 KPa.

5. The method as claimed in claim 1, wherein said high vacuum is lower than about 10 kPa.

6. The method as claimed in claim 5, wherein said high vacuum is between 4 and 7 kPa.

7. The method as claimed in claim 2, wherein said low vacuum is smaller than 50 kPa.

8. The method as claimed in claim 7, wherein said low vacuum is lower than 45 kPa.

9. The method as claimed in claim 1, wherein said first predetermined period is slightly shorter than said second predetermined period, and each of said other predetermined periods is substantially shorter than said predetermined first period.

10. The method as claimed in claim 9, wherein each of said other predetermined periods is shorter than a tenth of said predetermined first period.

11. The method as claimed in claim 9, wherein said first predetermined period is between about 22 and 28 seconds, said second predetermined period is between about 27 and 35 seconds and said predetermined third and fourth periods are each around 1 second.

12. The method as claimed in claim 1, wherein said battery cell is a lithium ion type battery cell.

13. An apparatus for filling electrolyte in a battery cell, wherein said battery cell is provided with an electrolyte injection receptacle, comprising:
   a fill head defining a pre-metering chamber,
   a plurality of synchronized valves allowing for only one of them to be open at a time,
   a source of high pressure coupled to the first one of said valves,
   a duct ending in the free atmosphere and coupled to the second one of said valves,
   a source of high vacuum coupled to the third of said valves;
   an adapter nozzle for providing a sealed connection towards said electrolyte injection receptacle of said cell, said nozzle communicating with the interior of said chamber at a lower end region thereof,
   a sealed and closable electrolyte fill port arranged at an upper region of said fill head connected to a source of electrolyte;
   a shut-off plunger arranged as a valve to separate lower and upper parts of said pre-metering chamber in a first position and to unite the previously separated parts in a second position; wherein
   said valves are connected with said upper part of said pre-metering chamber.

14. The apparatus as claimed in claim 13, wherein said chamber defines a conical, downwardly tapering lower portion, with said plunger being conical and shaped to form fit to a lower section of said tapering lower portion, and said plunger being guided for vertical reciprocal motion and having a rod extending out of said fill head, a seal is provided between said rod and said fill head.

15. The apparatus as claimed in claim 13, wherein said synchronized valves comprise a fourth valve and a source of low vacuum coupled to said fourth one of said valves.

16. A fill head assembly for simultaneously filling a predetermined number of battery cells, comprising a predetermined number of filling heads each designed as defined in claim 15 and fixed mechanically one beside the other in a row to form a mechanical unit, wherein said assembly comprises said four valves and said lines connecting said valves to the interiors of said chambers being paralleled, said plungers being individually arranged in each of said chambers, said sealed and closable electrolyte fill ports being provided on a pair of sliding elements being common for all of said fill heads and being simultaneously opened and closed depending on the relative position of said sliding elements.

17. The fill head assembly as claimed in claim 16, wherein said sliding elements are moved by respective cams and cam followers.

18. The fill head assembly as claimed in claim 16, wherein said assembly can be connected and disconnected with a cell support holding and supporting just as many battery cells as the number of the fill heads in said assembly.

19. A rotary index table for filling electrolyte in a plurality of cells at a time, comprising number n index positions, in each of said index positions a respective one of said fill head assembly as claimed in claim 13 is arranged, in a first position a pick and place station is arranged in front of said table, and respective cell support transporting and returning conveyors are arranged at said pick and place station spaced from said index table, wherein said pick and place station picking a multiple cell support with non-filled cells from said conveyor and after a half-circle rotation placing the same in said position and taking an arriving multiple cells support with filled battery cells and placing them on said conveyor.

20. The rotary index table as claimed in claim 19, wherein n=8, said table is octagonal, and each of said fill head assemblies comprises eight of said fill heads, wherein said table is revolved in discrete steps of 15 seconds to take a revolution in 2 minutes.

21. The rotary index table as claimed in claim 19, wherein a filling status can be maintained through more than one index position by maintaining the same pressure values in the next index position as it was during the previous one, whereby the technology periods can be different than the predetermined indexing periods.

* * * * *